United States Patent [19]
Barnes

[11] Patent Number: 5,026,115
[45] Date of Patent: Jun. 25, 1991

[54] CHILD CAR SEAT COVER

[76] Inventor: Laura A. Barnes, 17232 Park Ave., Lansing, Ill. 60438

[21] Appl. No.: 460,661

[22] Filed: Jan. 3, 1990

[51] Int. Cl.⁵ .......................................... A47C 31/10
[52] U.S. Cl. ................................... 297/219; 297/488
[58] Field of Search ............... 297/218, 219, 487, 488

[56] References Cited

U.S. PATENT DOCUMENTS

| | | | |
|---|---|---|---|
| 1,619,556 | 3/1927 | Aaron | 297/218 |
| 4,003,599 | 1/1977 | Takamatsu | 297/218 X |
| 4,342,483 | 8/1982 | Takada | 297/488 |
| 4,540,219 | 9/1985 | Klinger | 297/487 |
| 4,619,468 | 10/1986 | Spill | 297/488 X |
| 4,718,721 | 1/1988 | Pompa | 297/219 |

Primary Examiner—Peter A. Aschenbrenner
Attorney, Agent, or Firm—Jerry T. Kearns

[57] ABSTRACT

A child car seat cover for covering a generally triangular front retaining plate of a child car seat having a generally rectangular locking member extending from a lower apex portion and a pair of shoulder straps extending from a top edge portion between spaced radiused corners includes a generally triangular cover formed from a washable padded fabric material. The cover has spaced front and back surfaces connected by side walls which converge from upper arcuate corners of the front surface to a rectangular lower flared apex portion. The cover has a plurality of flaps including cooperating hook and loop type fastening strips for securement to the retaining plate.

1 Claim, 3 Drawing Sheets

CHILD CAR SEAT COVER

BACKGROUND OF THE INVENTION

1. Field of the Invention

The present invention relates to seat covers, and more particularly pertains to a child car seat cover for covering a generally triangular front retaining plate of a conventional type child car seat. The retaining plate is releasably securable by a rectangular locking member to restrain a child in the car seat. On hot summer days, the retaining plate, which is typically formed from a black vinyl material, becomes extremely hot when left inside an automobile. This provides a danger of burning a child, if the child is immediately placed into the car seat. Prior to the present invention, the typical practice was for individuals to run the car air conditioner for a period of time until the retaining plate was sufficiently cooled so as not to burn the child. This is a considerable inconvenience and results in the waste of both time and gasoline. In order to overcome these problems, the present invention provides a removable, padded and washable fabric cover for the retaining plate to protect a child from burning.

2. Description of the Prior Art

Various types of seat covers are known in the prior art. A typical example of such a seat cover is to be found in U.S. Pat. No. 2,904,103, which issued to W. Nail on Sept. 15, 1959. This patent discloses a car seat cover formed from an irregularly shaped fabric piece. U.S. Pat. No. 4,232,898, which issued to A. Bodrero on Nov. 11, 1980, discloses a conformable seatback cover including front and back panels connected by stretchable side panels. U.S. Pat. No. 4,478,453, which issued to B. Schutz on Oct. 23, 1984, discloses an adjustable cover for an infant car seat which has front and rear sections joined along a top portion to form a recess into which the upper part of the back and the forwardly extending sides of the infant car seat are received. U.S. Pat. No. 4,536,028, which issued to M. Jones et al on Aug. 20, 1985, discloses a fitted sheet cover adapted for use with a lounge type foldable beach chair which includes pocket formations at each end for engagement over the ends of the chair and transverse elastic straps for placement behind the chair at the points where the head and foot portions of the chair are hingedly connected to the central chair section. U.S. Pat. No. 4,693,511, which issued to S. Seltzer et al on Sept. 15, 1987, discloses an auto seat cover including a back cover portion and a seat portion joined by a common seam. Straps extend from the common seam for fitting through a crevice of the auto seat between its back rest and seat cushion.

While the above mentioned devices are directed to seat covers, none of these devices disclose a cover for a triangular retaining plate of a child car seat to prevent burning of a child when the car seat is left within an automobile on a hot summer day. Inasmuch as the art is relatively crowded with respect to these various types of seat covers, it can be appreciated that there is a continuing need for and interest in improvements to such seat covers, and in this respect, the present invention addresses this need and interest.

SUMMARY OF THE INVENTION

In view of the foregoing disadvantages inherent in the known types of seat covers now present in the prior art, the present invention provides an improved child car seat cover. As such, the general purpose of the present invention, which will be described subsequently in greater detail, is to provide a new and improved child car seat cover which has all the advantages of the prior art seat covers and none of the disadvantages.

To attain this, a representative embodiment of the concepts of the present invention is illustrated in the drawings and makes use of a child car seat cover for covering a generally triangular front retaining plate of a child car seat having a generally rectangular locking member extending from a lower apex portion and a pair of shoulder straps extending from a top edge portion between spaced radiused corners which includes a generally triangular cover formed from a washable padded fabric material. The cover has spaced front and back surfaces connected by side walls which converge from upper arcuate corners of the front surface to a rectangular lower flared apex portion. The cover has a plurality of flaps including cooperating hook and loop type fastening strips for securement to the retaining plate.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved child car seat cover which has all the advantages of the prior art seat covers and none of the disadvantages.

It is another object of the present invention to provide a new and improved child car seat cover which may be easily and efficiently manufactured and marketed.

It is a further object of the present invention to provide a new and improved child car seat cover which is of a durable and reliable construction.

An even further object of the present invention is to provide a new and improved child car seat cover which is susceptible of a low cost of manufacture with regard to both materials and labor, and which accordingly is then susceptible of low prices of sale to the consuming public, thereby making such seat covers economically available to the buying public.

Still yet another object of the present invention is to provide a new and improved child car seat cover which provides in the apparatuses and methods of the prior art some of the advantages thereof, while simultaneously overcoming some of the disadvantages normally associated therewith.

Still another object of the present invention is to provide a new and improved child car seat cover for covering the triangular front retaining plate of a child car seat to prevent burning of a child when the car seat is left within the interior of an automobile on a hot day.

Yet another object of the present invention is to provide a new and improved child car seat cover for the triangular front retaining plate of a child car seat which is easily removed and installed for convenient cleaning.

Even still another object of the present invention is to provide a new and improved child car seat cover for covering a triangular front retaining plate of a child car seat which is formed from a washable padded fabric material to prevent burning of a child and to provide a padded cover to prevent injury to a child's legs.

These together with other objects of the invention, along with the various features of novelty which characterize the invention, are pointed out with particularity in the claims annexed to and forming a part of this disclosure. For a better understanding of the invention, its operating advantages and the specific objects attained bY its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
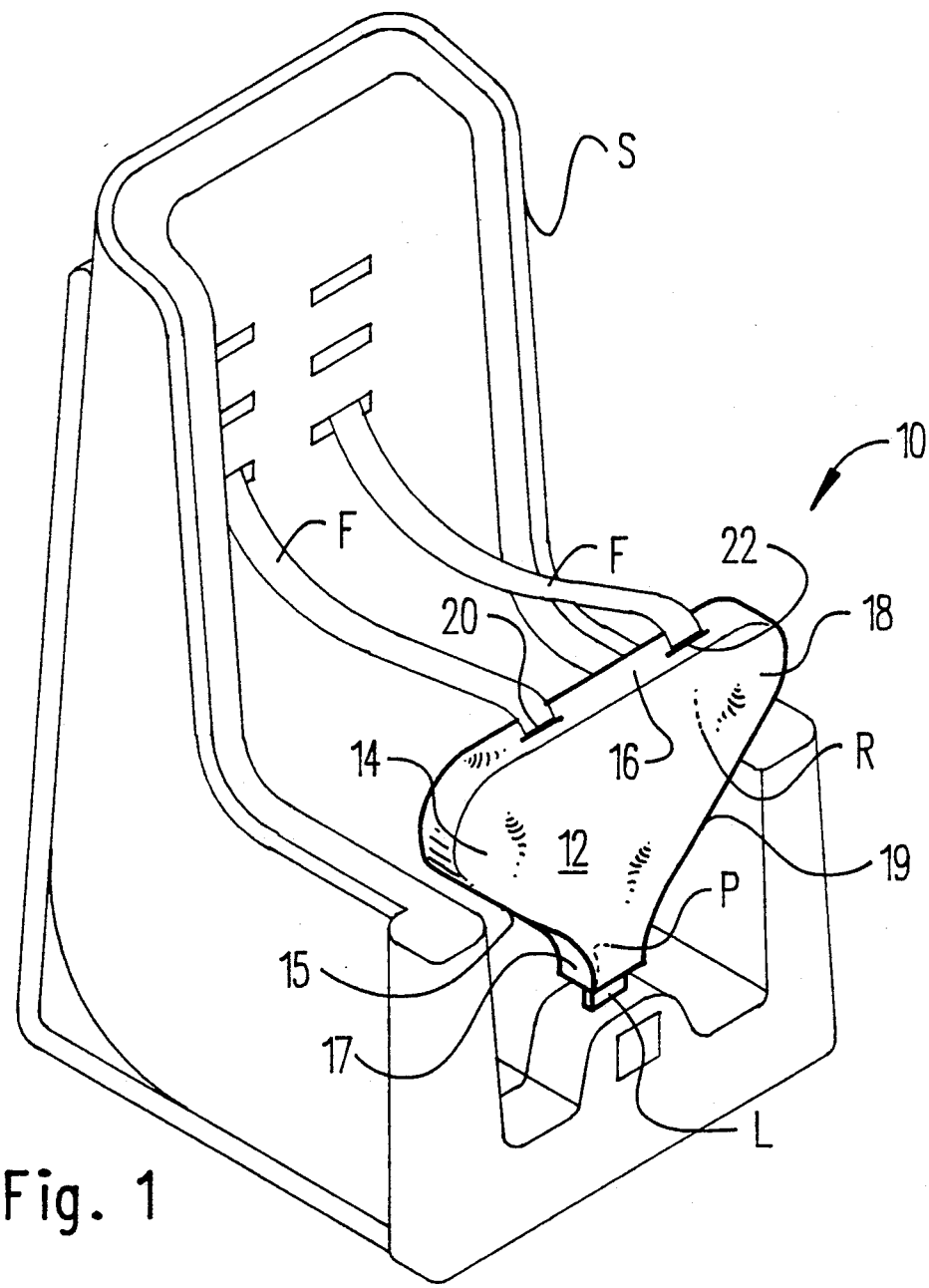
FIG. 1 is a perspective view of the child car seat cover of the present invention installed on a conventional generally triangular front retaining plate of a conventional child car seat.

With reference now to the drawings, and in particular to FIG. 1 thereof, a new and improved child car seat cover embodying the principles and concepts of the present invention and generally designated by the reference numeral 10 will be described.

More specifically, it will be noted that the first embodiment 10 of the invention includes a cover, formed from a padded, washable fabric material, installed on a generally triangular front retaining plate R of a conventional child car seat S. The child car seat S is of the type having a pair of shoulder fastening straps F extending from a top edge portion of the retaining plate R. The retaining plate R has a lower apex portion flared to a generally rectangular locking projection P having a projecting locking member L. Two upper corners of the retaining plate R are radiused and connected by a top edge portion. In use, a child is first placed into the seat S and the retaining plate R is then locked into position. The child's legs are situated on opposite sides of the retaining plate R. Thus, the side of the retaining plate R facing the seat S is exposed to the child. Conventionally, the retaining plate R is formed from a black vinyl material which becomes very hot on summer days when left in a closed automobile. This poses a hazard of burning a child. In order to overcome this problem, the present invention provides a cover having a front surface including arcuate corners 14 and 18 dimensioned to for overlying the radiused upper corners of the plate R. A top edge portion 16 of the cover overlies the top edge portion of the retaining plate R. A pair of spaced reinforced slits 20 and 22 are formed in the top edge 16 of the cover 10 to receive the fastening straps F. A lower tapering portion 17 of the cover 10 is dimensioned to closely surround the rectangular locking projection P at the lower apex portion of the plate R. The flared portion 17 includes an internal elastic garter to maintain close engagement with the projection P.

Figure 2:
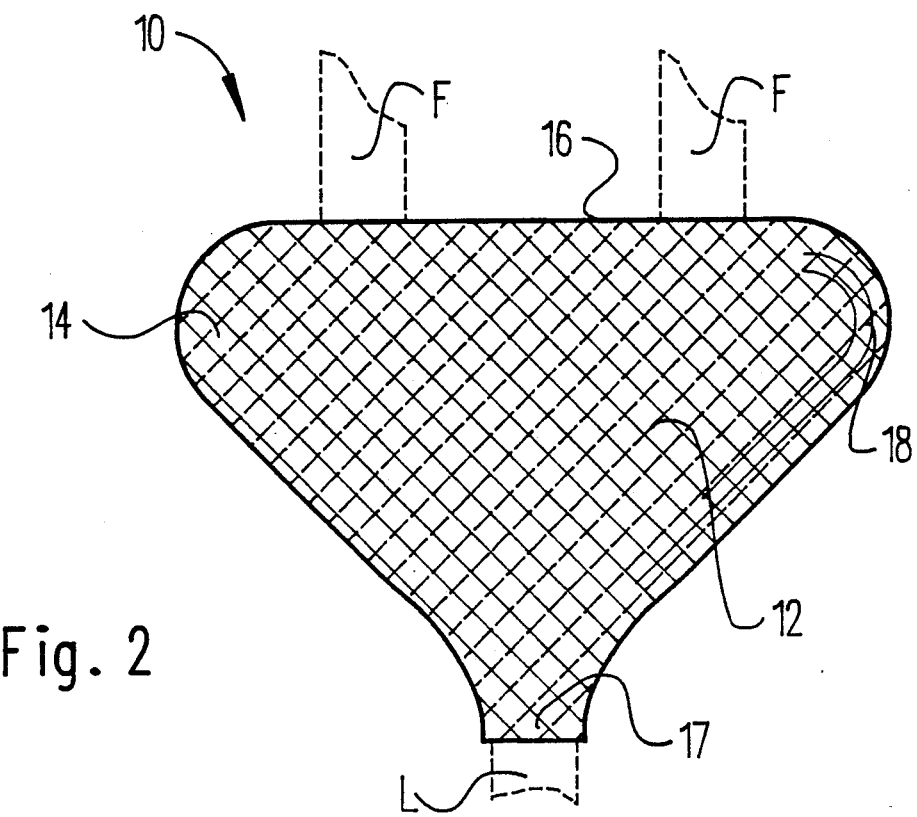
FIG. 2 is a front side view illustrating the child car seat cover of the present invention.

FIG. 2 illustrates the front side 12 of the cover 10 which faces away from the car seat S shown in FIG. 1. The side portion 12 of the cover 10 is formed from a generally triangular padded fabric material and has radiused corner portions 14 and 18 dimensioned for conformance with the radiused corner portions of the child car seat retaining plate. A lower apex of the cover 10 flares to a rectangular portion 8 dimensioned for close fitting overlying abutment with one side face of the rectangular locking member P illustrated in FIG. 1. The locking lug portion L extends through an open end portion of the cover 10 for conventional engagement into the aperture provided in the car seat S. The cover 10 is preferably formed from a light colored material so as not to absorb solar radiation. The cover 10 provides protection against burning a child, as well as providing additional padding to protect the child's legs.

Figure 3:
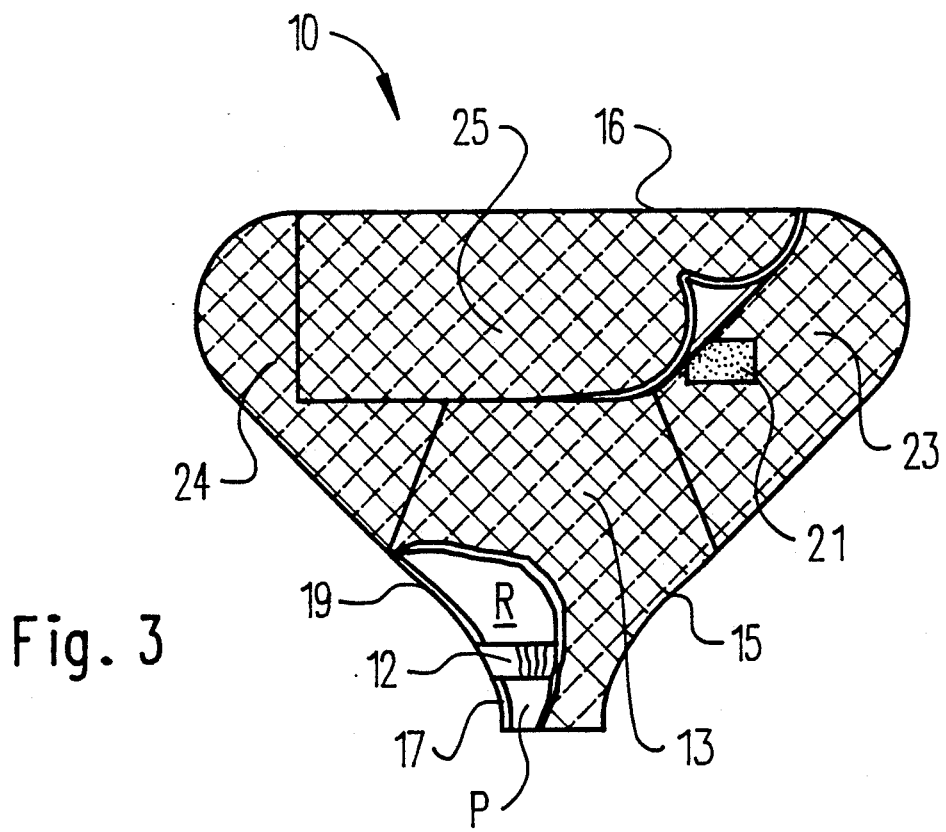
FIG. 3 is a back side view of the child car seat cover of the present invention, installed on the triangular front retaining plate of a conventional child car seat.

FIG. 3 provides a back side view of the cover 10, installed on the retaining plate R. As shown, the arcuate upper radiused corners of the plate R are covered by fabric flaps 23 and 24. Side edge portions 15 and 19 of the cover 10 extend toward the arcuate upper corners of the plate R, from the lower flared rectangular apex 17 of the cover 10. The internal elastic strap or garter 12 extends around the projection P. The flaps 23 and 24 are formed by extensions of the front portion 12 of the cover 10, and are secured to the back surface 13 of the cover 10 by cooperating hook and loop type fastening strips, to be illustrated subsequently. Additional hook and loop type fastening strips, for example 21, are secured on the exposed surfaces of the flaps 23 and 24, for cooperation with similar fastening strips provided on an inner surface of the flap 25, which is a continuation from the top edge 16 of the cover 10.

Figure 4:
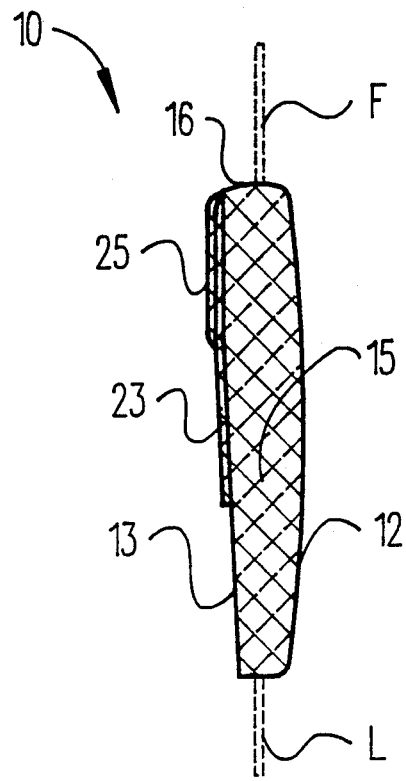
FIG. 4 is a side elevational view illustrating the child car seat cover of the present invention.

FIG. 4 illustrates a side view of the cover 10. It should be understood that the opposite side view is identical.

Figure 5:
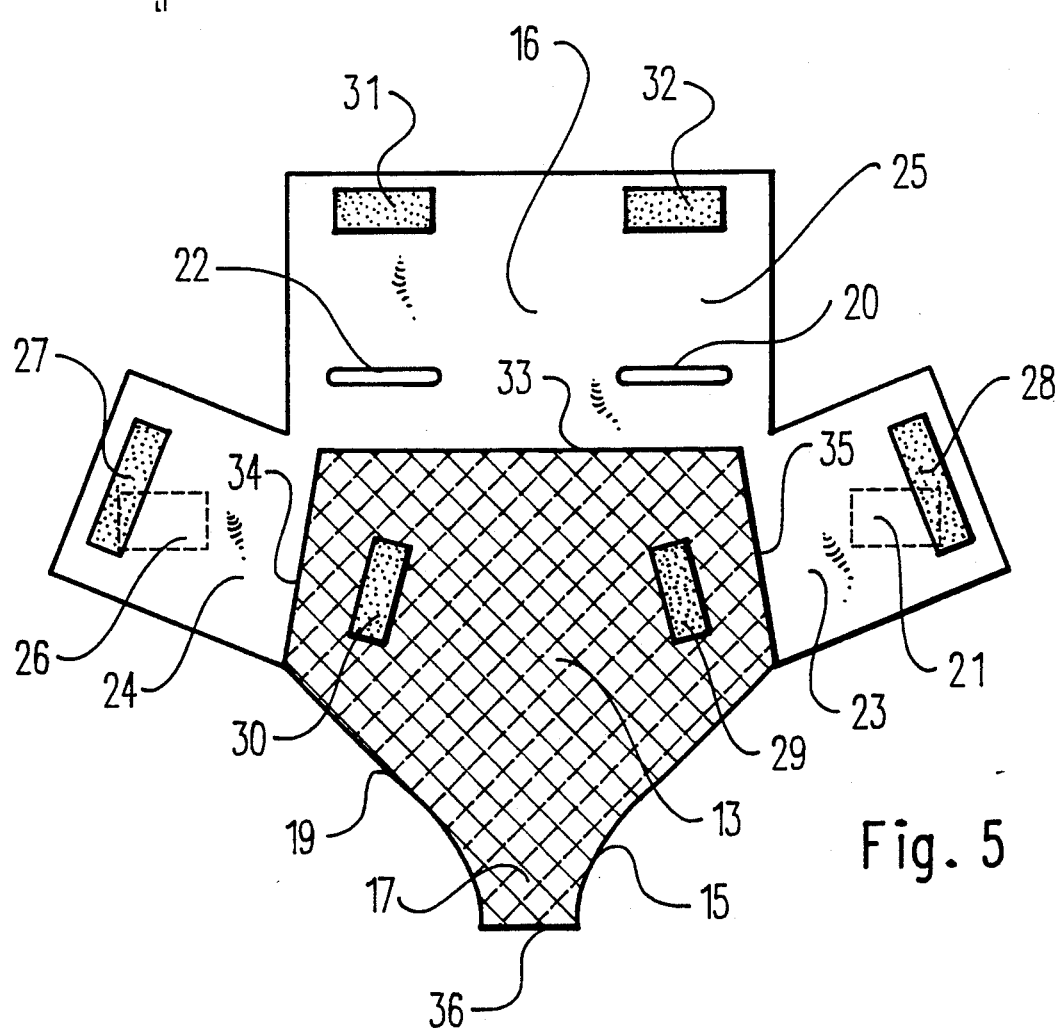
FIG. 5 is a back side view illustrating securing flaps of the car seat cover of the present invention, including cooperating hook and loop fasteners for securing the cover to the retaining plate.

As illustrated in FIG. 5, fastening strips 21 and 26 are secured on the front surfaces of the flaps 23 and 24, while fastening strips 27 and 28 are secured on their back surfaces. Fastening strips 31 and 32 are secured on the back surface of the flap 25. In the illustrated open configuration, the cover 10 has openings 33, 34, 35, and 36, which allow insertion of the plate R of the child car seat. After the retaining plate R has been inserted between the front 12 and back 13 surfaces of the cover 10, the fastening straps F are threaded through the slits 20 and 22. The corner flaps 23 and 24 are then folded over the back surface 13, and the cooperating hook and loop fastening strip pairs 27, 30 and 28, 29 are then engaged. The top flap 25 is then folded over the back surface 13, and the fastening strip pairs 30, 31 and 29, 32 are engaged, to completely enclose the retaining plate R.

As may now be understood, the present invention provides an easily installed removable washable cover which overcomes a serious safety hazard present in a widely utilized type of conventional child car seat.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A child car seat cover for covering a generally triangular front retaining plate of a child car seat having a generally rectangular locking member extending from a lower apex portion and a pair of shoulder straps extending from a top edge portion extending between two spaced radiused corners, comprising:

a generally triangular cover formed from a fabric material and having spaced parallel front and back surface connected by side walls;

two upper arcuate corners of said front surface of said triangular cover dimensioned to overlie the radiused corners of the font retaining plate;

a lower apex portion of said triangular cover flaring to a rectangular portion dimensioned for close fitting overlying abutment with the rectangular locking member;

said side walls on said triangular cover extending in converging relation from said arcuate corners to said lower apex of said cover;

an elastic strap within said lower apex, said elastic strap dimensioned for surrounding the rectangular locking member;

a top edge portion of said cover extending between said arcuate corners;

a pair of slits formed in said cover top edge portion for receiving the shoulder straps;

a pair of corner flaps formed by continuations of said arcuate corners of said front surface of said cover;

a first hook and loop type fastening strip secured on a front surface of each of said corner flaps;

a second hook and loop type fastening strip secured on a back surface of each of said corner flaps;

third and fourth hook and loop type fastening strips secured in spaced relation on said back surface of said cover, for engagement with said second fastening strips;

a top flap formed by a continuation of said top edge of said cover;

and fifth and sixth hook an loop type fastening strips secured in spaced relation on a back surface of said top flap, for engagement with said first fastening strips.

* * * * *